United States Patent [19]

Watanabe et al.

[11] 4,449,955
[45] May 22, 1984

[54] OPERATING SHAFT MECHANISM IN A PUSHBUTTON TUNER

[75] Inventors: Tadaaki Watanabe; Yoshio Tanaka, both of Saitama, Japan

[73] Assignee: Clarion Co., Ltd., Tokyo, Japan

[21] Appl. No.: 290,442

[22] Filed: Aug. 6, 1981

[30] Foreign Application Priority Data

Aug. 8, 1980 [JP] Japan .............................. 55-111724[U]

[51] Int. Cl.³ ........................ F16D 3/52; F16H 35/18; H03J 5/06
[52] U.S. Cl. ..................... 464/78; 74/10 R; 74/10.8; 334/7; 464/87; 464/179
[58] Field of Search .................... 464/78, 87, 92, 106, 464/147, 179, 181, 903; 74/10 R, 10.33, 10.8; 403/364; 334/7

[56] References Cited

U.S. PATENT DOCUMENTS

| | | | |
|---|---|---|---|
| 2,470,282 | 5/1949 | Baker et al. | 403/364 X |
| 3,150,506 | 9/1964 | Alcaro | 464/78 |
| 3,393,535 | 7/1968 | Morin | 464/903 X |
| 3,543,599 | 12/1970 | Caswell | 464/78 X |
| 3,634,791 | 1/1972 | Yasuda et al. | 334/7 |
| 3,832,908 | 9/1974 | Brewster | 464/87 X |
| 3,844,137 | 10/1974 | Zugel | 464/78 |
| 4,186,612 | 2/1980 | Welch et al. | 334/7 X |

*Primary Examiner*—Stuart S. Levy
*Assistant Examiner*—Daniel P. Stodola
*Attorney, Agent, or Firm*—Flynn, Thiel, Boutell & Tanis

[57] ABSTRACT

An operating shaft mechanism in a pushbutton tuner, etc. characterized in that there is formed an enlarged portion in a central portion of a shaft element and the enlarged portion is formed with a plurality of slits in different phases with each other. The enlarged portion thus comprises a plurality of disc portions connected to each other by connecting portions which remain at the bottoms of the slits, thus to be flexible.

3 Claims, 9 Drawing Figures

OPERATING SHAFT MECHANISM IN A PUSHBUTTON TUNER

BACKGROUND OF THE INVENTION

1. Field of the Invention

This invention relates to an operating shaft mechanism in a pushbutton tuner, and more particularly to a manual tuning shaft mechanism in a pushbutton tuner having a simple structure and capable of being mounted easily as well as being produced at low cost.

2. Description of the Prior Art

It is generally known that a pushbutton tuner has to be arranged not only to achieve tuning operation by pushing pushbuttons in a one-touch manner but also to perform fine tuning by rotating a manual tuning shaft.

A conventional tuning shaft which has been provided to this end is shown in FIG. 1. A shaft manually rotatable shaft 21 and a driven shaft 22 are connected to each other by a universal joint 24. The manual shaft 21 is rotatably supported in a casing 20 in a manner as shown in the drawing. The driven shaft 22 is provided with a pinion 22a at the right end thereof which engages with a crown gear 23. The manual shaft 21 and the driven shaft 22 are mounted in a manner so that they intersect at an angle with each other at the region of the universal joint 24. With this arrangement, by manually rotating the manual shaft 21 to rotate the crown gear 23 thus causing a core to shift in and out of a coil by means of a rotatable crank or a movable element, the desired fine tuning operation is performed.

However, in such a conventional mechanism, in addition to the fact that the shafts 21 and 22 are formed separately, there has been required the universal joint 24 which comprises two U-shaped elements mounted on the adjacent ends of the shafts 21 and 22, respectively, as well as a cross-shaped element interposed between the two U-shaped elements. That is, there has been required a large number of parts, resulting in an increase of the number of steps for assembling them. Further, those parts constructing the universal joint 24 have had to be made of a material with a high elasticity such as a phosphor bronze which is expensive.

SUMMARY OF THE INVENTION

It is therefore an object of the present invention to solve the above problems in the conventional art.

In accordance with the present invention, there is provided an operating shaft mechanism in a pushbutton tuner, etc. which comprises:

a manual shaft;

a driven shaft; and an enlarged element for connecting said shafts, said enlarged element being formed with a plurality of slits.

DETAILED DESCRIPTION OF THE PREFERRED EMBODIMENT

Figure 1:
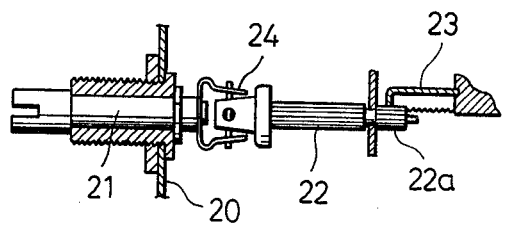
FIG. 1 shows a partially sectional elevation of a conventional manual tuning shaft mechanism.

The present invention will now be described in detail referring to the preferred embodiments illustrated in the accompanying drawings of FIG. 2 and the consequent.

An integrally formed shaft member 1 is provided instead of the above mentioned conventional manual shaft and driven shaft. The shaft member 1 comprises an enlarged portion 2 formed at a central portion thereof and formed with a plurality of radially extending slits so as to divide the enlarged portion 2 into a plurality of disc portions 5 except at the connecting portions 4 which remain at the bottoms of the slits 3 without being cut off. Those slits 3 have arranged bottoms i.e. the connecting portions 4 are positioned at different angular phases. Thus, the disc portions 5 are connected to each other only at the connecting portions 4, and therefore, the enlarged portion 2 is made flexible.

It is necessary to provide two slits 3 and when providing two slits 3 they are opposedly positioned at a phase difference of 180°, and on the other hand, when providing three slits 3 they may be positioned at an interval of about 120°. Further, when providing 4 slits 3, four connecting portions 4 may be formed at an interval of 90°, or otherwise, two pairs of slits opposedly positioned at a phase difference of 180° may be formed.

Thus, the enlarged portion 2 which is integrally formed with the shaft member 1 can be provided with slits 3 and the connecting portions 4. The shaft member 1 can be made not only of a metal but also of a hard plastic material as required. Further, it is possible to form only the enlarged portion 2 of a plastic material. In this case, the number of parts increases accordingly. However, it still has a merit of largely reducing the number of parts and assembly steps as compared with the conventional structure as shown in FIG. 1 which required at least 3 pieces for just the universal joint 24.

Figures 2A, 2C:
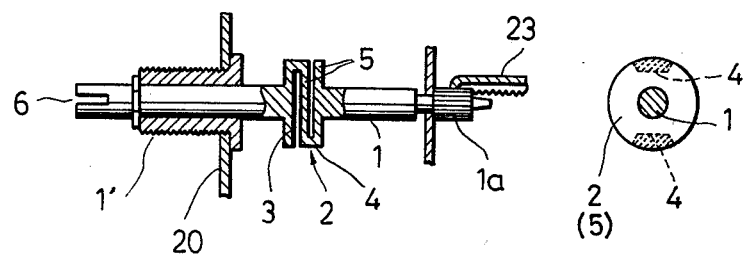
FIG. 2 is an explanation drawing of an embodiment according to the present invention of which (A) is a partially sectional elevation, (B) is a partial plan view of (A) and (C) is an end view of (B)
Figure 2B:
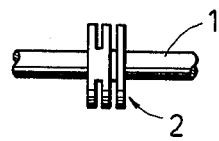
Figure 3:
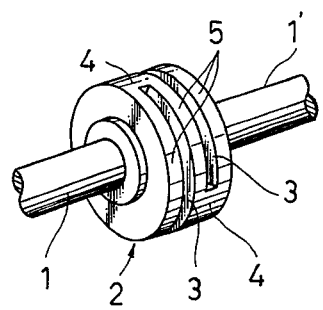
FIG. 3 shows a perspective view of an enlarged portion of the manual tuning shaft as shown in FIG. 2.
Figure 4:
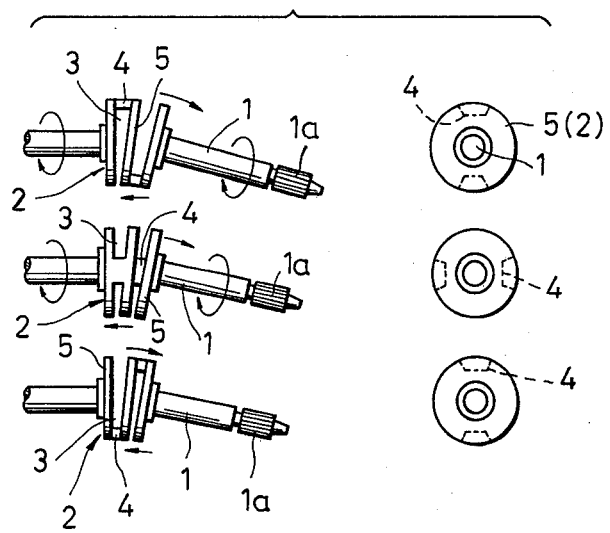
FIG. 4 includes elevations and end views by which operating steps are shown.
Figure 5:
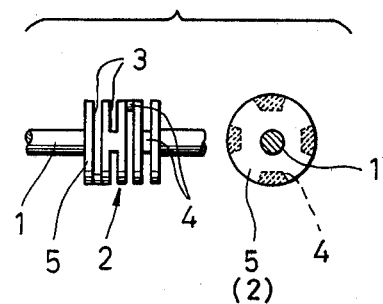
FIG. 5 shows a partial elevation and end view of a modification of the enlarged portion.

The shaft mechanism as shown in FIGS. 2 and 3 is operated as shown in FIG. 4. The shaft member 1 is supported in a manner so that the manual shaft portion and the driven shaft portion thereof from a predetermined angle. Thus, when a rotational force is applied to the shaft member 1, the disc portions 5 are moved relative to each other as shown in FIG. 4. That is, although the enlarged portion 2 is not changeable in its axial length at the connecting portions 4, it can be elongated and shortened at the outer peripheries of the slits 3. Therefore, the enlarged portion 2 smoothly transmits rotational force while repeating its expansion and shrinkage and while keeping the predetermined angle between the manual shaft portion and the driven shaft portion thereof. The crown gear 23 is thereby rotated by a pinion portion 1a formed at the right end of the shaft member 1 in the same manner as shown in FIG. 1 to perform the fine tuning.

As apparent from the description about the embodiment as shown in FIGS. 2-4, smooth transmission of rotational force can be achieved while an angle between two parts of the shaft similar to that of the universal joint 24 of FIG. 1 exists. Further, the whole shaft member is substantially integrally formed thus resulting in extreme reduction of the number of required parts as well as complicated steps for assembling them. Additionally, since the required mechanism can be obtained without making the shaft of an expensive material such as phosphor bronze, it is possible to largely reduce the production cost.

Figures 6, 7:
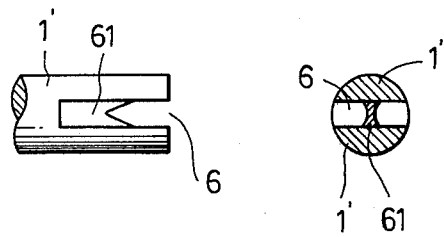
FIG. 6 and FIG. 7 are an elevation and a sectional view of an end the shaft member.

Incidentally, at the free end of the manual shaft portion of the shaft member 1, a knob for manual operation has to be mounted. To this end, the end is provided with a split for mounting the knob as shown in FIGS. 6 and 7. However, when making the manual shaft portion 1' of the shaft member 1 of a plastic material, due to a higher elasticity of a plastic material as compared with a metal, the wall portions extending on both sides of the split are apt to be inwardly deformed to cause substantial diminution of the diameter of the shaft member 1, thus causing the knob to disengage from the shaft member 1. In this case, by providing a strengthening rib in the slit for preventing the wall portions from inwardly bending, it is possible to avoid such deformation of the shaft end and to securely fix the knob. For example, as shown in FIGS. 6 and 7, there is provided a strengthening rib 61 formed at the bottom of the slit 6 in a manner connecting the opposed wall portions extending on both sides of the slit 6. This example of the rib 61 extends from the bottom to a central portion of the slit 6. However, it may be formed otherwise in accordance with the thickness of the rib 61, width of the slit 6 and elasticity of the material of the manual shaft portion 1'.

As shown in the above preferred embodiment, by providing a strengthening rib in the slit of the shaft end, the shaft end can be prevented from being undesirably deformed irrespective of the presence of the slit and the knob is perfectly prevented from disengaging from the shaft end. Particularly, since the strengthening rib is also made of the same plastic material as the shaft, it can be deformed when a large force is applied to press the knob onto the shaft, for example, and can return to its originally perpendicular condition as shown in FIG. 7 to apply force to keep the opposed wall portions spaced from each other. Therefore, the friction engagement between the shaft and the knob can be increased.

Incidentally, the above description is made mainly about tuning shafts for use in pushbutton tuners. However, the operating shaft according to the present invention may be utilized for shafts other than tuning shafts. Further, the shaft elements 1, 1' and the enlarged portion 2 may be integrally formed of a plastic material.

We claim:

1. An operating shaft for a tuner, comprising an integral shaft member formed from a plastic material, said shaft member including a manual shaft portion, a driven shaft portion and an enlarged portion which connects said manual and driven shaft portions, said enlarged portion having first means defining a plurality of first slits therein for imparting flexibility to said enlarged portion, and second means provided at an end of said manual shaft portion remote from said enlarged portion for facilitating support of a knob on said end of said manual shaft portion, said second means including two spaced, axially extending wall portions at said end of said manual shaft portion, which wall portions define an axially extending second slit, said second means including an axially extending strengthening rib disposed in said second slit and extending between said wall portions, said rib being integral with said shaft member and being capable of elastic deformation when a large force is applied thereto as a knob is pressed onto said end of said manual shaft portion of said shaft member, and wherein said rib is disposed in the central region of said second slit and extends axially from the bottom of said second slit partway to the open axially outer end of said second slit so that the axially outer end portion of said second slit is free of said rib, the thickness of said rib being substantially smaller than the width of said second slit.

2. The operating shaft of claim 1, including a pinion provided on and integral with said driven shaft portion at a location thereon spaced from said enlarged portion.

3. An operating shaft for a tuner, comprising an integral shaft member formed from a plastic material, said shaft member including a manual shaft portion, a driven shaft portion and an enlarged portion which connects said manual and driven shaft portions, said enlarged portion having first means defining a plurality of first slits therein for imparting flexibility to said enlarged portion, and second means provided at an end of said manual shaft portion remote from said enlarged portion for facilitating support of a knob on said end of said manual shaft portion, said second means including two spaced, axially extending wall portions at said end of said manual shaft portion, which wall portions define an axially extending second slit, said second means including an axially extending strengthening rib disposed in said second slit and extending between said wall portions, said rib being integral with said shaft member and being capable of elastic deformation when a large force is applied thereto as a knob is pressed onto said end of said manual shaft portion of said shaft member, and wherein said rib is disposed in the central region of said second slit and extends axially from the bottom of said second slit partway to the open axially outer end of said second slit so that the axially outer end portion of said second slit is free of said rib, the thickness of said rib being substantially smaller than the width of said second slit, said rib having a V-shaped notch in the outer end thereof.

* * * * *